United States Patent
Biondini et al.

(10) Patent No.: US 9,299,963 B2
(45) Date of Patent: *Mar. 29, 2016

(54) CASE FOR VALVE-REGULATED LEAD-ACID BATTERIES

(75) Inventors: Gisella Biondini, Ferrara (IT); Marco Ciarafoni, Ferrara (IT); Mara Destro, Ferrara (IT); Paola Massari, Ferrara (IT); Fiorella Pradella, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 42 days.

This patent is subject to a terminal disclaimer.

(21) Appl. No.: 14/232,539

(22) PCT Filed: Jul. 13, 2012

(86) PCT No.: PCT/EP2012/063749
§ 371 (c)(1),
(2), (4) Date: Jan. 13, 2014

(87) PCT Pub. No.: WO2013/010926
PCT Pub. Date: Jan. 24, 2013

(65) Prior Publication Data
US 2014/0171592 A1    Jun. 19, 2014

Related U.S. Application Data

(60) Provisional application No. 61/508,818, filed on Jul. 18, 2011.

(30) Foreign Application Priority Data

Jul. 15, 2011   (EP) ..................... 11174081

(51) Int. Cl.
| | |
|---|---|
| *C08L 23/00* | (2006.01) |
| *H01M 2/02* | (2006.01) |
| *C08L 23/12* | (2006.01) |
| *H01M 10/06* | (2006.01) |
| *H01M 10/12* | (2006.01) |
| *C08L 23/08* | (2006.01) |
| *C08L 23/14* | (2006.01) |

(52) U.S. Cl.
CPC ............. *H01M 2/0257* (2013.01); *C08L 23/08* (2013.01); *C08L 23/12* (2013.01); *C08L 23/14* (2013.01); *C08L 23/142* (2013.01); *H01M 2/026* (2013.01); *H01M 2/0237* (2013.01); *H01M 2/0262* (2013.01); *H01M 2/0295* (2013.01); *H01M 10/06* (2013.01); *H01M 10/121* (2013.01); *Y02E 60/126* (2013.01)

(58) Field of Classification Search
CPC ................................................. H01M 2/0257
See application file for complete search history.

(56) References Cited

U.S. PATENT DOCUMENTS

| | | | |
|---|---|---|---|
| 3,700,614 A | 10/1972 | Schenkerberg | |
| 4,133,797 A | 1/1979 | Tirpak et al. | |
| 5,011,891 A * | 4/1991 | Spenadel et al. | 525/211 |
| 6,045,883 A | 4/2000 | Akiyama et al. | |
| 7,482,406 B2 * | 1/2009 | News et al. | 525/240 |
| 7,572,860 B2 * | 8/2009 | De Palo et al. | 525/191 |
| 2007/0117932 A1 * | 5/2007 | De Palo et al. | 525/240 |
| 2010/0068615 A1 * | 3/2010 | Kaito et al. | 429/163 |

FOREIGN PATENT DOCUMENTS

WO    WO2004/087807 A1    10/2004

OTHER PUBLICATIONS

PCT International Search Report & Written Opinion mailed Oct. 15, 2012, for PCT/EP2012/063749.

* cited by examiner

Primary Examiner — Irina Krylova

(57) ABSTRACT

A case for valve-regulated lead-acid battery comprising an olefin polymer composition comprising:
A) From 60 wt % to 95 wt %, of a propylene homopolymer, or a copolymer of propylene containing 3% or less of ethylene, said homopolymer or copolymer having a Polydispersity Index (P.I.) value of from 4.6 to 10 and a fraction insoluble in xylene at 25° C., higher than 98 molar %; and
B) from 5 wt % to 40 wt %, of a copolymer of propylene and ethylene containing from 30 wt % to 65 wt % of ethylene derived units;
the sum A)+B) being 100.

3 Claims, No Drawings

CASE FOR VALVE-REGULATED LEAD-ACID BATTERIES

This application is the U.S. National Phase of PCT International Application PCT/EP2012/063749, filed Jul. 13, 2012, claiming priority of European Patent Application No. 11174081.7, filed Jul. 15, 2011, and the benefit under 35 U.S.C. 119(e) of U.S. Provisional Application No. 61/508,818 filed Jul. 18, 2011, the contents of which are incorporated herein by reference in their entirety.

FIELD OF THE INVENTION

The present invention relates to case for valve-regulated lead-acid batteries comprising a propylene composition having particular features, in particular having an high flexural modulus at high temperature.

BACKGROUND OF THE INVENTION

A valve-regulated lead-acid battery (VRLA battery) is the designation for low-maintenance lead-acid rechargeable batteries. Because of their construction, VRLA batteries do not require regular addition of water to the cells.

As opposed to vented (also called flooded) batteries, a VRLA cannot spill its electrolyte if it is inverted. Because VRLA batteries use much less electrolyte (battery acid) than traditional lead-acid batteries, they are also occasionally referred to as an "acid-starved" design.

The name "valve regulated" does not wholly describe the technology; these are really "recombinant" batteries, which means that the oxygen evolved at the positive plates will largely recombine with the hydrogen ready to evolve on the negative plates, creating water and so preventing water loss. The valve is a safety feature in case the rate of hydrogen evolution becomes dangerously high. In flooded cells, the gases escape before they have a chance to recombine, so water must be periodically added.

These VRLA batteries have a pressure relief valve which will activate when the battery is recharged at high voltage, typically greater than 2.30 volts per cell. (A 12 volt battery has six cells.). During the charging a quite high temperature is developed in the battery and valve activation allows some of the gas or electrolyte to escape, thus decreasing the overall capacity of the battery. For this reason a material able to resist at high pressure, i.e. having a high flexural modulus, at high temperature is preferable.

Several polyolefin compositions have been proposed for vented batteries. For example WO 2006/125720 relates to a propylene polymer composition comprising (percent by weight):
a) from 65% to 77%, preferably 70 to 77%, of a crystalline propylene polymer having an amount of isotactic pentads (mmmm), measured by on the fraction insoluble in xylene at 25° C., higher than 97.5 molar % and a polydispersity index ranging from 5 to 10;
b) 8 to less than 13%, preferably 9 to 12%, of an elastomeric copolymer of ethylene and propylene, the copolymer having an amount of recurring units deriving from ethylene ranging from 30 to 70%, preferably 35 to 60%, and being partially soluble in xylene at room temperature; the polymer fraction soluble in xylene at room temperature having an intrinsic viscosity value ranging from 2 to 4 dl/g; and
c) 10-23%, preferably 10 to 20%, of polyethylene having an intrinsic viscosity value ranging from 1.5 to 4 d/lg and optionally containing recurring units derived from propylene in amounts lower than 10%.

However these compositions shows values of flexural modulus unsatisfactory when they have to be used as cases for VRLA batteries.

BACKGROUND OF THE INVENTION

It has now been found that it is possible to use for cases for VRLA batteries polypropylene compositions with a particularly advantageous balance of properties, in particular of high rigidity and good impact resistance, by operating in two polymerization stages. In the first stage propylene is polymerized or copolymerized with minor amounts of comonomer(s), and in the second stage ethylene/α-olefin(s) mixtures are copolymerized in the presence of the propylene polymer obtained in the first step.

DETAILED DESCRIPTION OF THE INVENTION

Thus an object of the present invention is a case for valve-regulated lead-acid battery comprising an olefin polymer composition comprising:
A) From 60 wt % to 95 wt %, preferably from 70 wt % to 93 wt %, more preferably from 85 wt % to 91 wt % of a propylene homopolymer, or a copolymer of propylene containing 3% or less of ethylene, said homopolymer or copolymer having a Polydispersity Index (P.I.) value of from 4.6 to 10, preferably from 5.1 to 8 and a fraction insoluble in xylene at 25° C., higher than 98 molar %, preferably from 98.5 to 99.5 molar %; preferably propylene homopolymer is used; and
B) from 5 wt % to 40 wt %, preferably from 7 wt % to 30 wt %, more preferably from 9 wt % to 15 wt % of a copolymer of propylene and ethylene containing from 30 wt % to 65 wt % preferably from 39 wt % to 57 wt %, more preferably from 41 wt % to 49 wt % of ethylene derived units; the sum A)+B being 100.

Preferably the MFR measured according to ASTM D 1238, condition L, 230° C., 2.16 Kg of component A ranges from 0.5 g/10 min to 20.0 g/10 min; more preferably from 1.0 g/10 min to 11.0 g/10 min; even more preferably from 1.5 g/10 min to 5.0 g/10 min.

Preferably the fraction soluble in xylene at 25° C. of the total composition is lower than 21 wt %; more preferably it is lower than 16 wt % even more preferably it is lower than 13 wt %.

Preferably the value of intrinsic viscosity (I.V.) of the fraction soluble in xylene at 25° C. ranges from 3.5 to 5.5 dl/g, preferably from 4.0 to 5.0 dl/g, more preferably from 4.5 to 4.9 dl/g Preferably the Flexural Modulus is higher than 1600 MPa, preferably comprised from 1700 to 2500 MPa.

Preferably the Flexural Modulus at 90° C. is higher than 450 MPa, preferably comprised from 450 to 1000 MPa.

The compositions of the present invention can be prepared with a polymerization process comprising at least two stages, where in the first stage the relevant monomer(s) are polymerized to form component (A) and in the following stage(s) the mixtures propylene-ethylene are polymerized to form component (B).

The component (A) is preferably prepared in a single polymerization stage. The order of the polymerization stages is not a critical process feature; however component (A) is preferably prepared before component (B).

The polymerization can occur in liquid phase, gas phase or liquid-gas phase.

For example, it is possible to carry out the propylene polymerization stage using liquid propylene as diluent, and the following copolymerization stage in gas phase, without intermediate stages except for the partial degassing of the propylene.

Examples of suitable reactors are continuously operated stirred reactors, loop reactors, fluidized-bed reactors or horizontally or vertically stirred powder bed reactors. Of course, the reaction can also be carried out in a plurality of reactors connected in series.

It is possible to carry out the polymerization in a cascade of stirred gas-phase reactors which are connected in series and in which the pulverulent reaction bed is kept in motion by means of a vertical stirrer. The reaction bed generally comprises the polymer which is polymerized in the respective reactor.

Reaction time, pressure and temperature relative to the polymerization steps are not critical, however it is best if the temperature is from 20 to 150° C., in particular from 50 to 100° C. The pressure can be atmospheric or higher.

The regulation of the molecular weight is carried out by using known regulators, hydrogen in particular.

The compositions of the present invention can also be produced by a gas-phase polymerisation process carried out in at least two interconnected polymerisation zones. The said type of process is illustrated in European patent application 782 587.

In detail, the above-mentioned process comprises feeding one or more monomer(s) to said polymerisation zones in the presence of catalyst under reaction conditions and collecting the polymer product from the said polymerisation zones. In the said process the growing polymer particles flow upward through one (first) of the said polymerisation zones (riser) under fast fluidisation conditions, leave the said riser and enter another (second) polymerisation zone (downcomer) through which they flow downward in a densified form under the action of gravity, leave the said downcomer and are reintroduced into the riser, thus establishing a circulation of polymer between the riser and the downcomer.

In the downcomer high values of density of the solid are reached, which approach the bulk density of the polymer. A positive gain in pressure can thus be obtained along the direction of flow, so that it becomes possible to reintroduce the polymer into the riser without the help of special mechanical means. In this way, a "loop" circulation is set up, which is defined by the balance of pressures between the two polymerisation zones and by the head loss introduced into the system.

Generally, the condition of fast fluidization in the riser is established by feeding a gas mixture comprising the relevant monomers to the said riser. It is preferable that the feeding of the gas mixture is effected below the point of reintroduction of the polymer into the said riser by the use, where appropriate, of gas distributor means. The velocity of transport gas into the riser is higher than the transport velocity under the operating conditions, preferably from 2 to 15 m/s.

Generally, the polymer and the gaseous mixture leaving the riser are conveyed to a solid/gas separation zone. The solid/gas separation can be effected by using conventional separation means. From the separation zone, the polymer enters the downcomer. The gaseous mixture leaving the separation zone is compressed, cooled and transferred, if appropriate with the addition of make-up monomers and/or molecular weight regulators, to the riser. The transfer can be effected by means of a recycle line for the gaseous mixture.

The control of the polymer circulating between the two polymerisation zones can be effected by metering the amount of polymer leaving the downcomer using means suitable for controlling the flow of solids, such as mechanical valves.

The operating parameters, such as the temperature, are those that are usual in gas-phase olefin polymerisation process, for example from 50 to 120° C.

This process can be carried out under operating pressures of between 0.5 and 10 MPa, preferably from 1.5 to 6 MPa.

Advantageously, one or more inert gases are maintained in the polymerisation zones, in such quantities that the sum of the partial pressure of the inert gases is preferably between 5 and 80% of the total pressure of the gases. The inert gas can be nitrogen or propane, for example.

The various catalysts are fed up to the riser at any point of the said riser. However, they can also be fed at any point of the downcomer. The catalyst can be in any physical state, therefore catalysts in either solid or liquid state can be used.

The polymerization catalyst is a Ziegler-Natta catalyst comprising a solid catalyst component comprising:

a) Mg, Ti and halogen and an electron donor selected from succinates, preferably from succinates of formula (I) below:

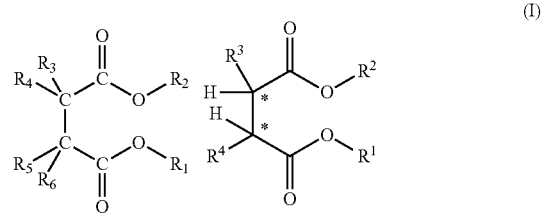

wherein the radicals $R_1$ and $R_2$, equal to, or different from, each other are a $C_1$-$C_{20}$ linear or branched alkyl, alkenyl, cycloalkyl, aryl, arylalkyl or alkylaryl group, optionally containing heteroatoms; the radicals $R_3$ to $R_6$ equal to, or different from, each other, are hydrogen or a $C_1$-$C_{20}$ linear or branched alkyl, alkenyl, cycloalkyl, aryl, arylalkyl or alkylaryl group, optionally containing heteroatoms, and the radicals $R_3$ to $R_6$ which are joined to the same carbon atom can be linked together to form a cycle; with the proviso that when $R_3$ to $R_5$ are contemporaneously hydrogen $R_6$ is a radical selected from primary branched, secondary or tertiary alkyl groups, cycloalkyl, aryl, arylalkyl or alkylaryl groups having from 3 to 20 carbon atoms, or a linear alkyl group having at least four carbon atoms optionally containing heteroatoms;

b) an alkylaluminum compound and, optionally (but preferably), c) one or more electron-donor compounds (external donor).

The process for the preparation of the polyolefin composition for preparing the case for valve-regulated lead-acid battery is described in EP 1 608 703.

The compositions to be used as cases for valve-regulated lead-acid battery of the present invention can also contain additives commonly employed in the art, such as antioxidants, antiacid agent, light stabilizers, heat stabilizers, nucleating agents, colorants and fillers.

In particular, the addition of nucleating agents brings about a considerable improvement in important physical-mechanical properties, such as Flexural Modulus, Heat Distortion Temperature (HDT), tensile strength at yield and transparency.

Typical examples of nucleating agents are the p-tert.-butyl benzoate and the 1,3- and 2,4-dibenzylidenesorbitols.

The nucleating agents are preferably added to the compositions of the present invention in quantities ranging from 0.05 to 2% by weight, more preferably from 0.1 to 1% by weight with respect to the total weight.

The addition of inorganic fillers, such as talc, calcium carbonate and mineral fibers, also brings about an improvement to some mechanical properties, such as Flexural Modulus and HDT. Talc can also have a nucleating effect.

The case object of the present invention can have any suitable shape for this use. Preferably the case has a parallelepiped shape.

The following examples are given to illustrate the invention without limiting the latter.

EXAMPLES

The following analytical methods have been used to determine the properties reported in the detailed description and in the examples.

Samples of the polymer to be analyzed have been prepared according to ISO 294-2 excepting for the measure of the Stress-whitening resistance.

MFR:
ASTM D 1238, condition L, 230° C., 2.16 Kg;
Intrinsic Viscosity [η]:
measured in tetrahydronaphthalene at 135° C.;
Ethylene Content (C2):

Ethylene content has been determined by IR spectroscopy.

The spectrum of a pressed film of the polymer is recorded in absorbance vs. wavenumbers ($cm^{-1}$). The following measurements are used to calculate C2 content:

a) Area ($A_t$) of the combination absorption bands between 4482 and 3950 $cm^{-1}$ which is used for spectrometric normalization of film thickness.

b) Area ($A_{C2}$) of the absorption band due to methylenic sequences ($CH_2$ rocking vibration) after a proper digital subtraction of an isotactic polypropylene (IPP) reference spectrum. The range 660 to 790 $cm^{-1}$.

Flexural Modulus:
The test was carried out according to ISO 178;
Flexural Modulus at 90° C.

The test at 90° C. was carried out according to ISO 178 with the additional steps of conditioning at 90° C. for one hour and testing the sample in a thermostatic chamber at 90° C.

Izod:
measured according to the ISO 180/1A method;
Polydispersity Index (PI):
measurement of molecular weight distribution of the polymer. To determine the PI value, the modulus separation at low modulus value, e.g. 500 Pa, is determined at a temperature of 200° C. by using a RMS-800 parallel plates rheometer model marketed by Rheometrics (USA), operating at an oscillation frequency which increases from 0.01 rad/second to 100 rad/second. From the modulus separation value, the PI can be derived using the following equation:

$$PI = 54.6 \times (\text{modulus separation})^{-1.76}$$

wherein the modulus separation (MS) is defined as:

$$MS = (\text{frequency at } G' = 500 \text{ Pa})/(\text{frequency at } G'' = 500 \text{ Pa})$$

wherein G' is the storage modulus and G" is the loss modulus.

Fractions Soluble and Insoluble in Xylene at 25° C.:
2.5 g of polymer are dissolved in 250 ml of xylene at 135° C. under agitation. After 20 minutes the solution is allowed to cool to 25° C., still under agitation, and then allowed to settle for 30 minutes. The precipitate is filtered with filter paper, the solution evaporated in nitrogen flow, and the residue dried under vacuum a 80° C. until constant weight is reached. Thus one calculates the percent by weight of polymer soluble and insoluble at room temperature (25° C.).

Stress-Whitening Resistance.
Preparation of the Plaque Specimens:

Plaques for stress whitening resistance measurement, having dimensions of 127×127×1.5 mm were prepared as follows:

The injection press was a Negri Bossi™ type (NB 90) with a clamping force of 90 tons. The mould was a rectangular plaque (127×127×1.5 mm)

The main process parameters are reported below:
Back pressure (bar): 20
Injection time (s): 3
Maximum Injection pressure (MPa): 14
Hydraulic injection pressure (MPa): 6-3
First holding hydraulic pressure (MPa): 4±2
First holding time (s): 3
Second holding hydraulic pressure (MPa): 3±2
Second holding time (s): 7
Cooling time (s): 20
Mould temperature (° C.): 60
The melt temperature was between 220 and 280° C.

Stress-Whitening Resistance:

The resistance to whitening at ambient temperature (about 23° C.) was determined by subjecting small discs of the polymer to be tested (diameter 38 mm, thickness 1.5 mm, obtained from plaques prepared as described above) to the impact of a dart dropping from different heights. The dart had diameter of 1.27 mm and a weight of 76 g. The stress-whitening resistance is expressed as the diameter of the whitened area (average value over 10 specimens tested for each dropping height).

Example 1

Preparation of the Solid Catalyst Component

Into a 500 ml four-necked round flask, purged with nitrogen, 250 ml of $TiCl_4$ are introduced at 0° C. While stirring, 10.0 g of microspheroidal $MgCl_2 \cdot 1.9C_2H_5OH$ (prepared according to the method described in ex. 2 of U.S. Pat. No. 4,399,054 but operating at 3000 rpm instead of 10000 rpm) and 9.1 mmol of diethyl 2,3-(diisopropyl)succinate are added. The temperature is raised to 100° C. and maintained for 120 min. Then, the stirring is discontinued, the solid product was allowed to settle and the supernatant liquid is siphoned off. Then 250 ml of fresh $TiCl_4$ are added. The mixture is reacted at 120° C. for 60 min and, then, the supernatant liquid is siphoned off. The solid is washed six times with anhydrous hexane (6×100 ml) at 60° C.

Catalyst System and Pre-Polymerization Treatment

The solid catalyst component described above was contacted at 12° C. for 24 minutes with aluminium triethyl (TEAL) and dicyclopentyldimethoxysilane (DCPMS) as outside-electron-donor component. The weight ratio between TEAL and the solid catalyst component and the weight ratio between TEAL and DCPMS are specified in Table 1.

The catalyst system is then subjected to pre-polymerization by maintaining it in suspension in liquid propylene at 20° C. for about 5 minutes before introducing it into the first polymerization reactor.

Polymerization

The polymerisation run is conducted in continuous in a series of two reactors equipped with devices to transfer the product from one reactor to the one immediately next to it. Polymer (A) is prepared in the first reactor described in EP 1 012 195. The catalyst is sent to the polymerisation apparatus that comprises two interconnected cylindrical reactors, riser and downcomer. Fast fluidisation conditions are established in the riser by recycling gas from the gas-solid separator. Polymer (B) is prepared in the second reactor that is a fluid bed gas phase reactors. Temperature and pressure are maintained constant throughout the course of the reaction. Hydrogen is used as molecular weight regulator. The gas phase (propylene, ethylene and hydrogen) is continuously analysed via gas-chromatography. At the end of the run the powder is discharged and dried under a nitrogen flow. The main polymerization conditions and the analytical data relating to the polymers produced in the three reactors are reported in Table 1.

TABLE 1

|  |  | Example 1 |
| --- | --- | --- |
| Component A) |  |  |
| TEAL/external donor | wt/wt | 5 |
| TEAL/catalyst | wt/wt | 5 |
| Temperature | ° C. | 80 |
| Pressure | bar-g | 28 |
| Split holdup riser | wt % | 40 |
| downcomer | wt % | 60 |
| $H_2/C_3$ riser | mol/mol | 0.011 |
| MFR | g/10 min | 3 |
| XS | wt % | 1.6 |
| Component B) |  |  |
| Temperature | ° C. | 75 |
| Pressure | MPa | 1.8 |
| Split | Wt % | 12 |
| $C_2/C_2 + C_3$ | Mol/mol | 0.35 |
| $H_2/C_2^-$ | Mol/mol | 0.023 |

$H_2$ = hydrogen;
$C_2$ = ethylene;
$C_3$ = propylene;
Split = amount of polymer prepared in the concerned reactor, referred to the total weight.
XS = xylene solubles at 25° C.

Comparative Example 2

Comparative example 2 is a commercial polymer sold by Lyondellbasell under the tradename Moplen EP 332L for battery cases. The polymer contains 83 wt % of propylene homopolymer and 17 wt % of a propylene/ethylene copolymer. The other features of Moplen EP 332L has been reported on table 3.

The polymer obtained in example 1 and the polymer of comparative example 2 have been additivated in extrusion with the additives reported in table 2

TABLE 2

| Additive | Amount wt % |
| --- | --- |
| DHT 4A | 0.0315 |
| DSTDP | 0.285 |
| Irganox B 225 | 0.15 |
| Talc HM05 | 0.85 |

The properties of the polymers have been reported in table 3

TABLE 3

|  |  | Example | |
| --- | --- | --- | --- |
|  |  | 1 | Comp 2 |
| Component A) |  |  |  |
| Amount of component A) | % wt | 88 | 83 |
| MFR | g/10' | 3 | 11 |
| XS | % wt | 1.6 | <2.5 |
| Polydispersity index | | 6 | 4 |
| component B) |  |  |  |
| Amount of component B) | % wt | 12 | 17 |
| % C2 by calc. | % wt | 45 | 50 |
| Total composition |  |  |  |
| I.V. of the XS | dl/g | 4.79 | 2.25 |
| MFR | g/10' | 2.2 | 6.5 |
| C2 tot | % wt | 4.7 | 7.7 |
| XS tot | % wt | 10.4 | 16 |
| Flexural Modulus +23° C. | MPa | 1922 | 1185 |
| Flexural Modulus +90° C. | MPa | 525 | 265 |
| Izod at 23° C. | kJ/m2 | 10.2 | 9.4 |
| Izod at 0° C. | kJ/m2 | 6.2 | 5.7 |
| Izod at −20° C. | kJ/m2 | 4.4 | 4.2 |
| Melting point | ° C. | 164.2 | — |
| Crystallization Temp. | ° C. | 115.9 | — |
| Whithening resistance: diameter (mm) of the whitening area due to a ram (76 g) falling from a heigh of | mm × 10 | 190 | 200 |
| | mm × 10 | 160 | 160 |
| | mm × 10 | 130 | 150 |
| | mm × 10 | 120 | 140 |
| | mm × 10 | 80 | 100 |

$C_2$ = ethylene;
$C_3$ = propylene;
XS xylene solubles at 25° C.

In table 3 results that the polymer composition according to the present invention shows an higher flexural modulus at 90° C. higher Izod and higher whitening resistance

What is claimed is:

1. A case for valve-regulated lead-acid battery comprising an olefin polymer composition consisting essentially of:
    A) from 85 to 91 wt % of a propylene homopolymer, or a copolymer of propylene containing 3% or less of ethylene, said homopolymer or copolymer having a polydispersity index (P.I.) value of from 5.1 to 8 and a fraction insoluble in xylene at 25° C. of 98.4 molar %; and
    B) from 9 to 15 wt % of a copolymer of propylene and ethylene containing from 30 wt % to 65 wt % of ethylene derived units;
       wherein the sum of the wt % amounts of A)+B) is 100, wherein the olefin polymer composition has a flexural modulus according to ISO 178 at 23° C. from 1922 to 2500 MPa and at 90° C. from 525 to 1000 MPa, wherein the MFR measured according to ASTM D 1238, condition 1, 230° C., 2.16 Kg of component A) ranges from 1.5 g/10 min to 5.0 g/10 min.

2. The case according to claim 1 wherein component A) is a propylene homopolymer.

3. The case according to claim 1 wherein the value of intrinsic viscosity (I.V.) of the fraction soluble in xylene at 25° C. ranges from 3.5 to 5.5 dl/g.

* * * * *